United States Patent [19]

Panster et al.

[11] Patent Number: 4,845,163

[45] Date of Patent: Jul. 4, 1989

[54] RHODIUM-CONTAINING ORGANOPOLYSILOXANE-AMMONIUM COMPOUNDS, METHODS FOR THEIR PREPARATION AND USE

[75] Inventors: Peter Panster, Rodenbach; Robert Gradl, Alzenau, both of Fed. Rep. of Germany

[73] Assignee: Degussa Aktiengesellschaft, Frankfurt, Fed. Rep. of Germany

[21] Appl. No.: 134,668

[22] Filed: Dec. 18, 1987

[30] Foreign Application Priority Data

Dec. 22, 1986 [DE] Fed. Rep. of Germany ....... 3643894

[51] Int. Cl.$^4$ ............................................. C08F 283/00
[52] U.S. Cl. .................................... 525/475; 525/477; 528/33; 528/38; 528/395
[58] Field of Search ........................... 528/33, 38, 395; 525/475, 477

[56] References Cited

U.S. PATENT DOCUMENTS

| | | | |
|---|---|---|---|
| 4,302,401 | 11/1981 | Oswald | 556/9 |
| 4,390,729 | 6/1983 | Oswald | 568/454 |
| 4,719,286 | 1/1988 | Matlow | 528/395 |

*Primary Examiner*—Melvyn I. Marquis

*Attorney, Agent, or Firm*—Beveridge, DeGrandi & Weilacher

[57] ABSTRACT

New rhodium containing organopolysiloxane-ammonium compounds are described which consist of units of the formula

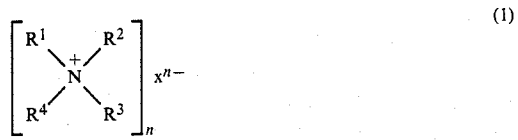

in which $R^1$, $R^2$ and $R^3$ are $R^5$—$SiO_{3/2}$ (2), $R^5$ is an alkylene group and the free valences of the oxygen atoms are saturated by silicon atoms of other groups (2), optionally with the insertion of cross-linking agents, $R^4$ is hydrogen, an alkyl, cycloalkyl or benzyl group, $x^{n-}$ is a complex monovalent or polyvalent metal anion of rhodium and chloride, bromide or iodide. Methods for preparing these rhodium-containing organopolysiloxane-ammonium compounds as well as their use as catalysts in reactions with carbon monoxide are also described.

10 Claims, No Drawings

RHODIUM-CONTAINING ORGANOPOLYSILOXANE-AMMONIUM COMPOUNDS, METHODS FOR THEIR PREPARATION AND USE

The present invention relates to new rhodium-containing organopolysiloxane-ammonium compounds in which the complex rhodium-containing anion is bound via an ionic bond to the organopolysiloxane matrix. The compounds, which are insoluble in water and organic solvents, represent valuable new catalyst systems which can be used instead of homogeneous catalysts, especially in carbonylation reactions, whereby they exhibit very good properties. However, compared to corresponding homogeneous catalysts, the catalysts of the invention have the advantage that they can be readily separated and recycled. The invention also concerns methods for preparing the new metal-containing organopolysiloxane-ammonium compounds.

The use of homogeneous catalysts in technology is frequently associated with problems of catalyst separation and catalyst recycling, the recovery of the usually valuable metal and of the frequently only brief durability of the catalysts. In order to avoid these disadvantages and to combine the advantages of homogeneous catalysts, in particular, the high activity and selectivity, with the known advantages of heterogeneous catalysts, efforts have been made worldwide to develop heterogenized homogeneous catalysts. The state of the art in this area has already been summarized in several survey articles, e.g. by D. D. Whitehurst in "Chemtech", Jan. 1980, p. 44 or R. H. Grubbs in "Chemtech", Aug. 1977, p. 5 or D. C. Bailey and S. H. Langer in "Chem. Rev." 81,2,109; 1981.

As a rule, organic polymers such as e.g. polystyrene were used as carrier materials. However, they generall did not exhibit the qualities which should characterize good catalyst carriers. They do not exhibit a rigid structure, so that the physical properties are heavily dependent on external parameters such as pressure, temperature and solvent. A swelling of the carriers in the solvent used is always necessary in order to make possible a penetration of the reactants to the catalytic centers and to prevent the reaction speed from being controlled by diffusion. The high mobility of the matrix also permits fixed metal units to come together, so that an undesired formation of catalytically inactive multinuclear complexes is made possible. Moreover, it can also occur that the polymeric matrix dissolves in the reaction medium used in an undesired manner.

Inorganic polymeric systems such as e.g. silica, silica gels or aluminum oxide are generally better suited for catalyst carriers as regards the physical properties. However, they exhibit an aggravating disadvantage to the extent that the number of functional groups via which a fixing of metal compounds can be completed is relatively low.

Recently, catalyst systems were able to be developed, as is described in German Offenlegungsschriften 30 29 599 and 31 31 954, in which metal compounds are fixed via covalent donor-acceptor bonds to carrier systems which consist of insoluble organopolysiloxanes containing donor groups and which exhibit the good properties of inorganic carriers but not their disadvantages. In addition, the matrix of these new polymeric carriers can be modified within a broad range and adapted to the requirements placed on it. In the meantime, catalyst systems were also developed on an analogous basis (DE-OS 34 04 702) in which complex platinum and/or palladium anions are bound via ionic bonds to organopolysiloxane carriers containing ammonium groups. The preparation of these organopolysiloxanes containing ammonium groups is described in German Offenlegungsschrift 31 20 195.

SUMMARY OF THE INVENTION

It is an object of the invention to increase the number of chemical reactions which can be performed with these catalyst systems and to develop catalysts on an organopolysiloxane basis with which carbonylation reactions in particular can be performed. As is known, complex rhodium compounds in particular are suited for this, whereby the catalytically active component is always an anionic rhodium complex, as is known (cf. D. Forster, "Advances in Organometallic Chemistry" 17, 255; 1979) which develops in the presence of carbon monoxide and iodide and has the formula $[Rh(CO)_2I_2]^-$. As an expert also knows, carbonylation reactions, e.g. the carbonylation of methanol to acetic acid or the carbonylation of dimethyl ether to acetic anhydride, only occur with sufficient speed in the presence of iodide. The iodide is preferably added in the form of alkyl iodide, elementary iodine or hydroiodic acid. Alkali iodides can basically also be used but are generally not as effective.

The above and other objects of the invention are obtained in accordance with the invention by means of new, temperature-resistant, rhodium-containing organopolysiloxane-ammonium compounds which are characterized in that they are composed of units of the general formula:

(1)

in which $R^1$, $R^2$ and $R^3$ represent a group of the general formula:

(2)

in which $R^5$ represents an alkylene group with 1 to 10 C atoms, a cycloalkylene group with 5,7 or 8 C atoms or for the units

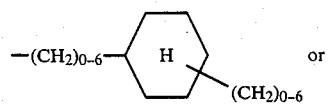

or

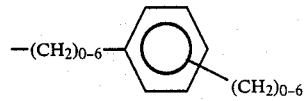

whereby $R^1$, $R^2$ and $R^3$ are identical or different and the free valences of the oxygen atoms are saturated either by silicon atoms of other groups of formula (2) and/or by cross-linking bridging groups of the formulae:

$SiO_{4/2}$ or $SiR'O_{3/2}$ or $SiR'_2O_{2/2}$ or
$TiO_{4/2}$ or $TiR'O_{3/2}$ or $TiR'_2O_{2/2}$ or
$AlO_{3/2}$ or $AlR'O_{2/2}$, where R' is a methyl group or ethyl group, the ratio between the silicon atoms in (2) to the bridge atoms silicon, titanium and aluminum is 1:0 to 1:10, $R^4$ is hydrogen, a linear or branched alkyl group containing 1 to 8 C atoms, a cycloalkyl group containing 5 to 8 C atoms or the benzyl group and $x^{n-}$ is $[Rh(CO)_2I_2]^-$, $[RhCl_6]^{3-}$ or $[RhCl_5]^{2-}$ and for $Cl^-$, $Br^-$, or $I^-$.

It was found that $R^5$ can be a linear or branched alkylene group without considerable material differences occurring in the final product.

Chloride, bromide or iodide can be present either individually or mixed in the polymer in addition to the complex rhodium units.

It is advantageous if the molar ratio between the anion types $[Rh(CO)_2I_2]^-$, $[RhCl_6]^{3-}$ or $[RhCl_5]^{2-}$ and the halogen anions is in a range of 1:1 to 1:100.

The inclusion of cross-linking agents containing silicon, titanium or aluminum serves to control the density of the rhodium and of the halogenide in the solid, the porosity (with which influence can be exerted on the selectivity of the catalyst) and to control the general material properties.

In addition, the cross-linking agent can also assume the function of a so-called activator or cocatalyst.

The polymeric ammonium compounds of formula (1) are especially preferable from the point of view of thermal stability and the inertness to chemical attacks (especially by bases) as well as the accessibility of the monomeric initial materials, whereby $R^1$, $R^2$ and $R^3$ are identical to each other and $R^4$ is equal to methyl.

Special advantages as concerns the availability of the initial materials and the material properties of the polymeric rhodium-containing organopolysiloxane-ammonium compounds are to be found in compounds which are composed of units of the formula:

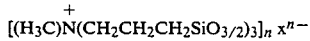
$[(H_3C)N(CH_2CH_2CH_2SiO_{3/2})_3]_n \, x^{n-}$ in which $x^{n-}$ has the same range of meaning as in formula (1) and otherwise the same conditions are present as in formula (1).

As regards the usage as carbonylation catalyst, an especially important active component is the polymer unit of the formula

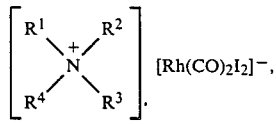

where $R^1$-$R^4$ have the same meaning as in formula (1).

The rhodium-containing organopolysiloxane-ammonium compounds of the invention can be prepared according to various methods.

A method which at first furnishes a precursor of the compounds of the invention is carried out by reacting an organopolysiloxane-ammonium compound described in DE-OS 31 20 195 and in DE-PS 31 20 214 and of the formula

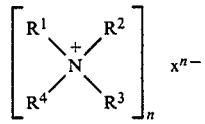

in which $R^1$-$R^4$ have the same meaning as in claim 1 and the free valences of the oxygen atoms are saturated either by silicon atoms of other groups of the formula:

$R^5$—$SiO_{3/2}$, where $R^5$ has the same significance as in claim 1 and/or by cross-linking binding links of the formulae:

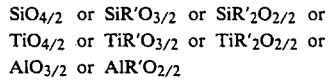

where R' represents a methyl group or ethyl group, the ratio between the silicon atoms in formula (2) to the bridge atoms silicon, titanium and aluminum is from 1:0 to 1:10 and $x^{n-}$ stands for $Cl^-$, $Br^-$ or $I^-$, with stoichiometric, low or excess amounts of the compounds:

$Na_3RhCl_6$, $K_3RhCl_6$, $(NH_4)_3RhCl_6$, $(NH_4)_2RhCl_5$ which optionally contain water of crystallization or [with amounts] of the corresponding free acids in water or with a polar organic solvent which dissolves the rhodium compounds at least partially for the mutual partial or complete exchange of the anions according to the static or the dynamic principle.

The rhodium-containing solid is optionally separated from the liquid phase and optionally washed in any sequence, dried at room temperature up to 200° C. under a protective gas or in a vacuum, classified and tempered at 150°-250° C. under protective gas or in a vacuum.

The term dynamic principle signifies an agitated suspension while the static method provides for a fixed bed of the polysiloxane.

A tempering of the product has often proven to be advantageous as regards an increasing of the stability of the matrix. It consists of a temperature treatment over a time period of at least one hour up to four days under the conditions stated. However, the rhodium-containing solid can also be supplied directly after the exchange while still moist with water or solvent to further usage.

A preferred reaction medium in which the introduction of the complex rhodium amine can occur in principle includes all polar solvents which are capable of dissolving at least partially the above-mentioned rhodium initial compounds. Such solvents are e.g. water, methanol, ethanol, n- and i-propanol, n- and i-butanol, acetone, dimethylformamide, dimethylsulfoxide, hexamethylphosphoric acid triamide, aliphatic or aromatic nitro compounds, nitriles or mixtures thereof. The alcohols mentioned are especially preferable.

Suitable temperatures at which this exchange can be performed are in a range of 20° to 200° C., whereby an optionally used superpressure corresponds to the sum of the partial pressures of the components of the reaction mixture at the particular temperature.

The selection of the stoichiometric ratios between the organopolysiloxane-ammonium compound used and the rhodium compound depends on whether a saturation or only a partial covering of the solid with the complex rhodium anion is to occur, with which influence can naturally be exerted on the properties of the catalyst obtained.

According to two other methods in accordance with the invention, polymers can be prepared in particular which contain units which are catalytically active in carboxylations and exhibit the formula:

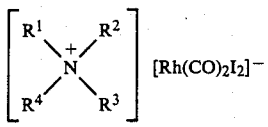

As the expert in the art knows, the complex rhodium anion $[Rh(CO)_2I_2]^-$ can be formed and stabilized only under special conditions.

The one method starts with an organopolysiloxane-ammonium compound of formula (1) obtained according to the method previously discussed, whereby $x^{n-}$ stands for $[RhCl_6]^{3-}$ or $[RhCl_5]^{2-}$ and optionally for $Cl^-$, $Br^-$ or $I^-$.

This compound is then caused to react at a temperature of 60°–200° C. in the presence of water, of an alkyl iodide with 1–10 C atoms, of elementary iodine or hydroiodic acid in a polar solvent with CO at a total pressure of approximately 1 bar to approximately 200 bar.

Then the rhodium-containing solid is separated from the liquid phase, optionally washed, optionally dried at room temperatures up to 200° C., classified and tempered at temperatures from 150°–250° C. under a protective gas atmosphere or in a vacuum.

However, the rhodium-containing polysiloxane can also be supplied directly to further usage while still moist with solvent and a few of the measures mentioned can also be eliminated or can be performed in a modified sequence.

The conversion of the complex Rh(III) anion bound to the ammonium polysiloxane matrix into the fixed Rh(I) anion containing CO is completed relatively rapidly under these conditions and can also occur practically simultaneously in the method previously described for bringing in the Rh component. This CO conversion is a known reaction and is described e.g. in "Inorganic Synthesis" 8, 211; 1966. It can be described e.g. when $RhCl_6^{3-}$ is used by the following equation:

$$RhCl_6^{3-} + 2I^- + 3CO \rightarrow [Rh(CO)_2I_2]^- + 4Cl^- + COCl_2 \qquad (I).$$

Although basically all of the previously mentioned polar solvents can be used, the lower alcohols with 1–4 C atoms and among these especially methanol are particularly preferred. An analogous situation also applies to the type of alkyl iodide used. Here too, basically all compounds with 1–10 C atoms can be used. However, the lower derivatives with 1–4 C atoms and among these especially methyl iodide are preferred particularly for reasons of solubility. As concerns the stoichiometric ratios, at least a sufficient amount of iodine must be present in the mentioned forms in order to form the complex rhodium-carbonyl anion and to replace the $Cl^-$ and $Br^-$ anions still present in the ammonium polysiloxane with $I^-$. In practice, however, a multiple amount of iodide is used. A similar situation also applies to the amount of water used which is required for releasing the iodide out of the alkyl iodide according to equation (II):

$$RI + H_2O \rightleftharpoons ROH + HI \qquad (II).$$

Here too, a multiple amount is used as regards the alkyl halide.

According to another method in accordance with the invention, the formation of the complex rhodium anion $[Rh(CO)_2I_2]^-$ occurs at first in solution (cf. D. Forster, "Advances in Organometallic Chemistry" 17, 222; 1979) and its fixing to the ammonium polysiloxane matrix via an anion exchange occurs simultaneously or subsequently.

To this end, a rhodium compound which is dissolved at least partially in a polar solvent, optionally contains water of crystallization and exhibits the formula $Na_3RhCl_6$, $K_3RhCl_6$, $(NH_4)_3RhCl_6$, $(NH_4)_2RhCl_5$, $RhY_3$, $Rh(NO_3)_3$, $Rh(acac)(CO)_2$, $RhH(CO)(PPh_3)_3$, $RhCl(As\ Ph_3)_3$, $RhCl(PPh_3)_3$, $[RhY(diene)]_2$, $[RhY(C_2H_4)_2]_2$, $[RhY(CO)_2]_2$, $[Rh(OAc)_2]_2$, $Rh(acac)_3$, $RhCl(CO)(PPh_3)_2$, where
Y = chlorine, bromine, iodine
diene = cyclooctadiene, norbornadiene
Ph = phenyl
OAc = acetate
acac = acetyl acetonate, is caused to react with CO at a total pressure of approximately 1 bar to approximately 200 bar at 60°–200° C. in the presence of water, an alkyl iodide with 1–10 C atoms or iodine or hydroiodic acid and in the presence of an ammonium polysiloxane of the formula:

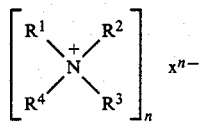

in which $R^1$–$R^4$ and $x^{n-}$ have the same significance as in claim 1 and $x^{n-}$ stands only for chloride, bromide or iodide.

The reaction is continued until the forming $[Rh(CO)_2I_2]_2^-$ anion has been brought partially or completely into the ammonium polysiloxane. The solid is then separated from the liquid phase, optionally washed, dried at room temperature up to 200° C., optionally under a protective gas atmosphere or in a vacuum, classified and tempered under a protective gas atmosphere or in a vacuum at 150°–250° C.

In this variant too, the modified rhodium-containing polysiloxane can also be supplied still moist with solvent directly to further usage and a few of the measures mentioned can also be eliminated performed or can be performed in a modified sequence.

Basically, other related rhodium compounds (e.g. with calcium or magnesium as cation) can also be used as initial material in the last-named method; however, only the simplest and most accessible representatives can be treated here.

As concerns their physical properties, the rhodium-containing organopolysiloxane-ammonium compounds of the invention behave like special silica gels which exhibit, depending on the pretreatment, specific surfaces of 1 to 1000 $m^2/g$ and particle size diameters of approximately 1 μm to 1 cm. The thermal stability is partially clearly above 250° C.

The rhodium-containing organopolysiloxane-ammonium compounds of the invention can be used according to a further object of the invention as valuable catalysts for carbonylations. Thus, for example methanol can be converted to acetic acid or methyl acetate and dimethyl eether to acetic anhydride with the aid of these catalysts. This occurs at temperatures of 100°–250° C. and total pressures of 10 to 300 bar in high selectivity and with good reaction speed.

DETAILED DESCRIPTION OF THE INVENTION

The invention is explained in more detail below in several embodiments while taking into consideration essentially the most important starting materials.

EXAMPLE 1

25 g of a polymeric ammonium compound consisting of units of the formula:

$$[(H_3C)N(CH_2CH_2CH_2SiO_{3/2})_3]^+I^-$$

were suspended in 200 ml methanol in which 2.64 g $Na_3RhCl_6 \cdot 12H_2O$ had previously been dissolved. The suspension was transferred into a 500 ml agitated autoclave and heated in it to 100° C. The mixture was agitated 4 h at this temperature, cooled down and then the solid matter was filtered off via a pressure filter. It was rewashed twice more with 100 ml methanol per time and then the solid was dried 4 h at 100° C. and 20 h at 150° C. under an $N_2$ atmosphere. The weight of the dark-red product was 25.5 g. An analysis which was performed yielded a Rh content of 1.55%, which allows one to conclude an almost 90% take-up of the added amount of $RhCl_6^{3-}$.

Accordingly, polymer units of the formula:

$$[(H_3C)N(CH_2CH_2CH_2SiO_{3/2})_3]_3^{3+}RhCl_6^{3-}$$

are contained in the product in the corresponding amount.

EXAMPLE 2

20 g of a polymeric ammonium compound consisting of units of the formula:

$$[(H_3C)N(CH_2CH_2CH_2SiO_{3/2})_3]^+Cl^- \cdot 3SiO_2$$

were suspended in 150 ml desalinated $H_2O$ in which 3.5 g $(NH_4)_2RhCl_5 \cdot H_2O$ had previously been dissolved. The suspension was heated in a 500 ml three-neck flask with a KPG agitator and reflux condenser to 80° C. and agitated 4 h at this temperature. Subsequently, the suspension was cooled down, the solid filtered off and twice with 100 ml desalinated water per time. After a 12-hour drying at 120° C. and a 12-hour tempering at 150° C. under an $N_2$ atmosphere, 21.6 g product were obtained. An analysis of this product yielded an Rh content of 3.9%, which allows one to conclude an approximately 80% take-up of the rhodium presented.

EXAMPLE 3

10 g of a polymeric ammonium compound consisting of units of the formula:

$$[(n-C_3H_7)N(CH_2CH_2CH_2SiO_{3/2})_3]^+Cl^-$$

were suspended in 150 ml ethanol. This suspension was compounded with 0.3 g $Na_3RhCl_6 \cdot 12H_2O$, then transferred into a 500 ml agitated autoclave and agitated 3 h at 120° C. After the mixture had cooled down to room temperature, a solid was filtered off, washed with 2×50 ml ethanol, then dried 5 h at 100° C. and tempered 24 h at 180° C. under nitrogen. The dried material was subsequently sieved off via a sieve with a mesh size if 50 μm. 9.5 g of the desired product with a Rh content of 0.35% remained.

EXAMPLE 4

25 g of a polymeric ammonium compound consisting of units of the formula:

$$HN[(CH_2)_3SiO_{3/2}]_3^+Cl^- \cdot (CH_3)_2SiO_{2/2}$$

with a particle size of 0.1–0.6 mm were first stirred into 100 ml methanol. After half an hour of stirring in, the solid was transferred into a column with an inner diameter of 20 mm. The column was loaded within 2 h with a 60° C. solution of 1.2 g $(NH_4)_3RhCl_6$ in 100 ml methanol. Subsequently, the solid was washed two times with 100 ml methanol, then transferred from the column into a dish and dried 8 h at 100° C. under an atmosphere of $N_2$. An Rh analysis performed on the solid (25.5 g) yielded a value of 1.05%, which allows one to conclude a take-up of over 80% of the rhodium added.

EXAMPLE 5

12 g of a polymeric ammonium compound consisting of units of the formula:

$$(H_3C)N[(CH_2)_8SiO_{3/2}]_3^+I^- \cdot TiO_2$$

were reacted analogously to example 3 with 0.5 g $Na_3RhCl_6 \cdot 12H_2O$. After drying 6 hours at 100° C. and a 10-hour tempering at 200° C. under an atmosphere of $N_2$, 12.2 g product with an Rh content of 0.65% were obtained.

EXAMPLE 6

15 g of an organopolysiloxane-ammonium compound consisting of units of the formula:

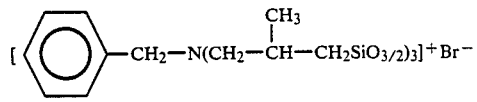

were reacted analogously to example 1 with 0.8 g $(NH_4)_3RhCl_6$ in 100 ml methanol and processed. 15.2 g product with an Rh content of 1.40% were obtained. It can be concluded therefrom that a corresponding amount of polymer units of the formula

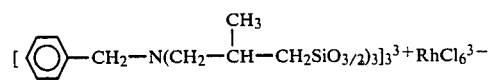

were now contained in the product.

EXAMPLE 7

20 g of an organopolysiloxane-ammonium compound consisting of units of the formula:

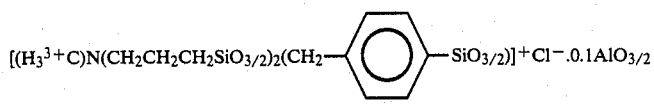

were compounded with 0.2 g H₃RhCl₆ dissolved in 60 ml in HCl solution. The suspension was agitated 5 h at approximately 100° C. in a 250 ml glass flask with a KPG agitator and reflux condenser, then filtered off via a vacuum suction and washed free of acid with a total of 300 ml desalinated water. After a 10-hour drying at 130° C., 20.2 g product with an Rh content of 0.28% were obtained.

EXAMPLE 8

10.0 g of the rhodium-containing organopolysiloxane-ammonium compound prepared in example 1 with an Rh content of 1.55% were suspended in 100 ml methanol. The suspension was compounded with 10 ml CH₃I as well as with 5 ml H₂O and then transferred into a 500 ml agitated autoclave with tantalum jacketing. After two rinsings with N₂, 20 bar pressure was applied and the mixture first heated to 120° C. and after 2 h to 150° C. After 5 hours of agitation at 150° C. and two re-pressings of the consumed CO to 40 bar total pressure per time, the mixture was cooled down, the pressure relieved in the autoclave and the solid filtered off. After two washings with 50 ml methanol per time, the solid was dried 8 h at 120° C. under an atmosphere of N₂. 9.8 g product were obtained which now exhibited a rhodium content of 1.45%. The IR spectrum exhibited 2 bands at approximately 2065 and 1990 cm⁻¹, as are typical for the [Rh(CO)₂I₂]⁻ anion.

EXAMPLE 9

10 g of the rhodium-containing organopolysiloxane-ammonium compound prepared in example 2 with an Rh content of 3.9% were suspended in 100 ml i-propanol. The mixture was compounded with 20 g 57% solution of hydroiodic acid and transferred into a 500 ml agitated autoclave with tantalum jacketing. After two rinsings with N₂, 10 bar CO pressure was applied and the mixture first heated to 130° C. and after 3 h to 160° C. Total pressure was maintained by re-pressing CO at 30 bar. After 4 h agitation, the mixture was cooled down, the pressure relieved in the autoclave and the solid filtered off. It was washed 3 times with 100 ml i-propanol per time and then dried 12 h at 120° C./100 mbar. 11.0 g product with an Rh content of 3.2% were obtained whose IR spectrum again exhibited the two typical CO bands vibrations at approximately 2065 and 1990 cm⁻¹.

EXAMPLE 10

10.2 g product in which, according to the IR spectrum, the [Rh(CO)₂I₂]¹³ anion was contained was obtained analogously to example 9 from 10 g of the rhodium-containing polymeric ammonium compound prepared in example 4, using water as reaction medium.

EXAMPLE 11

26 g of an organopolysiloxane-ammonium compound consisting of units of the formula:

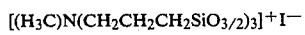

were suspended in 200 ml CH₃OH in which 1095 mg RhCl₃·3H₂O had previously been dissolved. 75 ml CH₃I and 20 ml desalinated water were also added to the suspension before it was transferred into a 500 ml autoclave. 50 bar CO pressure was applied, then the mixture was heated to 120° C. and agitated 6 h at this temperature while the total pressure was maintained at 50 bar. Then, the mixture was heated under permanent CO consumption to 150° C. and after another 2 h to 180° C. After it had been agitated another 2 h at 180° C., it was cooled off, the reactor relieved of pressure and the dark-red solid filtered off. After having been washed twice with 100 ml CH₃OH per time, the solid was dried 4 h at 100° C. and 16 h at 150° C. under an atmosphere of nitrogen. 25.8 g product with an Rh content of 1.19% were obtained whose IR spectrum exhibited the typical CO vibration bands for the [Rh(CO)₂I₂]⁻ anion.

EXAMPLE 12

30 g of a polymeric ammonium compound consisting of units of the formula:

were suspended in 130 ml menthanol. The suspension was compounded with 20 ml H₂O, 1.25 g RhI₃ and 20 g I₂. After the suspension had been transferred into a 500 ml agitated autoclave with tantalum jacketing, the reactor was loaded with 10 bar CO and heated to 100° C. The total pressure in the reactor was maintained at 30 bar by dosing in CO. The mixture was agitated 4 h at this temperature, then the temperature was increased to 130° C. and after a further 3 h to 160° C. and the mixture was agitated again for 2 h. Then the mixture was cooled down to room temperature and the reactor relieved of pressure. The dark-red, almost black solid was filtered off, washed 3 times with 50 ml methanol per time and then dried 4 h at 100° C. and 16 h at 160° C. 30.2 g product with an Rh content of 0.61% were obtained. The IR spectrum exhibits the typical bands of the [Rh(CO)₂I₂]⁻ anion.

EXAMPLE 13

21.5 g product with an Rh content of 1.01% were obtained from 20 g of a polymeric ammonium compound consisting of units of the formula:

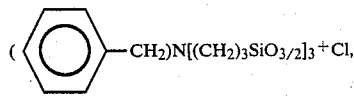

1.5 g Na₃RhCl₆·12H₂O, 50 ml CH₃I, 10 ml H₂O and 150 ml CH₃OH analogously to example 11, whereby the IR spectrum exhibited the two typical CO bands of the [Rh(CO)₂I₂]⁻ anion.

EXAMPLE 14

16.9 g product with an Rh content of 0.78% were obtained analogously to example 11 from 15 g of a polymeric ammonium compound consisting of units of the formula:

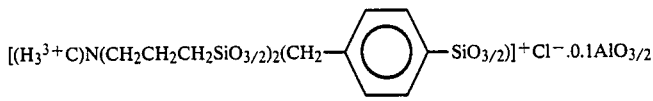

and 0.5 g $Rh_2O_3$, 50 ml $C_2H_5I$, 10 ml $H_2O$ and 200 ml ethanol.

EXAMPLE 15

19.9 g product with a rhodium content of 0.8% were obtained analogously to example 11 from 20 g of a polymeric ammonium compound consisting of units of the formula:

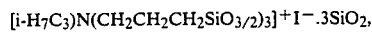

2.0 g $RhCl(PPh_3)_3$, 30 g $n-C_3H_7I$, 10 ml $H_2O$ and 200 ml $n-C_3H_7OH$.

EXAMPLE 16

18.3 g product with a rhodium content of 2.6% were obtained analogously to example 11 from 18 g of a polymeric ammonium compound consisting of units of the formula:

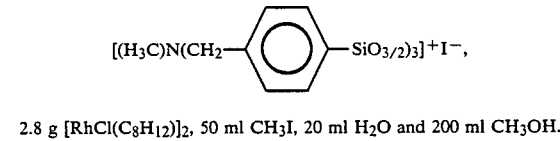

2.8 g $[RhCl(C_8H_{12})]_2$, 50 ml $CH_3I$, 20 ml $H_2O$ and 200 ml $CH_3OH$.

EXAMPLE 17

25.4 g product with an Rh content of 0.81% were obtained analogously to example 11 from 26 g of a polymeric ammonium compound consisting of units of the formula:

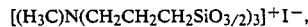

1.0 g $[Rh(OAC)_2]_2 \cdot 2H_2O$, 50 g benzyl iodide, 10 ml $H_2O$ and 200 ml $CH_3OH$.

EXAMPLE 18

10 g of the rhodium-containing organopolysiloxane-ammonium compound prepared according to example 1 were suspended in 300 ml methanol. The suspension was reacted with 18.7 ml $CH_3I$ as well as with 5 ml $H_2O$ and then transferred into a one l autoclave with tantalum jacketing. After the autoclave was rinsed twice with $H_2$, 50 bar CO pressure was applied and the mixture first heated to 120° C. and after 2 h to 150° C. and again after 4 h to 180° C. During this time, the total pressure was maintained by refilling CO at 50 bar. After 16 h, almost no absorption of CO could be detected any longer. Approximately 200 ml liquid was discharged from the reactor via an immersion tube and then a mixture of 300 ml methanol and 18.7 ml $CH_3I$ was again dosed in via a pump. The reaction was continued and this time almost no absorption of CO could be detected after 14 h. 350 ml liquid were discharged from the reactor and a mixture of 300 ml methanol and 300 ml $CH_3I$ was again dosed in. After 13 h, almost no absorption of CO could be detected any longer; the reactor was cooled down and then its entire content was discharged.

A gas-chromatographic examination of the three discharged charges yielded the following compositions, not taking into account the iodide components:

1st charge: 92% acetic acid, 6% methyl acetate, 2% $H_2O$ and $CH_3OH$.

2nd charge: 93% acetic acid, 6% methyl acetate, 1% $H_2O$ and $CH_3OH$.

3d charge: 95% acetic acid, 4% methyl acetate, 1% $H_2O$ and $CH_3OH$.

EXAMPLE 19

5 g of the rhodium-containing organopolysiloxane-ammonium compound prepared in example 9 were suspended in a mixture of 300 ml $CH_3OH$ and 18.7 ml $CH_3I$. The suspension was transferred into a 1 l agitated autoclave. After the autoclave had been rinsed twice with $N_2$, 40 bar CO pressure was applied and the reactor heated to 180° C. The same procedure was used as in example 18 and a discharge was performed after 14 h, a following 13 hours and after another 13 hours. The 3 charges exhibited practically the same composition as in example 18, that is, each exhibited acetic acid contents of over 90%.

EXAMPLE 20

A product charge was discharged in accordance with the method practiced in example 19 after 18 h, a following 20 h and a subsequent 18 h using 5 g of the rhodium-containing organopolysiloxane-ammonium compound prepared according to example 16. According to gas-chromatographic analysis, the charges exhibited the following compositions:

1st charge: 94% acetic acid, 5% methyl acetate, 1% $H_2O$

2nd charge: 95% acetic acid, 4% methyl acetate, 1% $H_2O$ 3d charge: 94% acetic acid, 5% methyl acetate, 1% $H_2O$.

Further variations and modifications of the invention will be apparent to those skilled in the art from the foregoing and are intended to be encompassed by the claims appended hereto.

The German priority application P 36 43 894.4-42 is relied on and incorporated by reference.

We claim:

1. A rhodium-containing organopolysiloxane-ammonium compound composed of units of the formula:

(1)

in which each $R^1$, $R^2$ and $R^3$ is a group of the formula:

(2)

in which $R^5$ is an alkylene group with 1 to 10 C atoms, a cycloalkylene ring with 5, 7 or 8 C atoms or the unit:

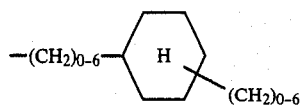

or

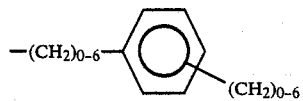

where $R^1$, $R^2$ and $R^3$ are identical or different and the free valences of the oxygen atoms are saturated either by silicon atoms of groups of formula (2) or by cross-linking bridging groups of the formulae:

| | | | | | |
|---|---|---|---|---|---|
| $SiO_{4/2}$ | or | $SiR'O_{3/2}$ | or | $SiR'_2O_{2/2}$ | or |
| $TiO_{4/2}$ | or | $TiR'O_{3/2}$ | or | $TiR'_2O_{2/2}$ | or |
| $AlO_{3/2}$ | or | $AlR'O_{2/2'}$ | | | | where R' is methyl or ethyl,
the ratio between the silicon atoms in (2) to the bridge atoms silicon, titanium or aluminum is 1:0 to 1:10,
$R^4$ is hydrogen, linear or branched alkyl containing 1 to 8 C atoms, cycloalkyl containing 5 to 8 C atoms or benzyl
and $x^{n-}$ is $[Rh(CO)_2I_2]^-$, $[RhCl_6]^{3-}$ or $[RhCl_5]^{2-}$ with optionally $Cl^-$, $Br^-$ or $I^-$.

2. A rhodium-containing organopolysiloxane-ammonium compound according to claim 1, characterized in that $R^1$, $R^2$ and $R^3$ are identical to each other and $R^4$ is equal to methyl.

3. A rhodium-containing organopolysiloxane-ammonium compound according to claim 2, characterized in that it is composed of units of the formula:

$[(H_3C)N(CH_2CH_2CH_2SiO_{3/2})_3]_n^+ x^{n-}$.

4. A method for preparing solid according to claim 1, characterized in that an organopolysiloxane-ammonium compound of the formula:

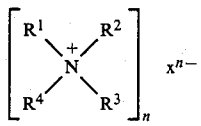

in which $R^1$-$R^4$ have the same meaning as in claim 1 and the free valences of the oxygen atoms are saturated either by silicon atoms of other groups of the formula:

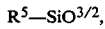

where $R^5$ has the same significance as in claim 1 and/or by cross-linking binding links of the formulae:

| | | | | | |
|---|---|---|---|---|---|
| $SiO_{4/2}$ | or | $SiR'O_{3/2}$ | or | $SiR'_2O_{2/2}$ | or |
| $TiO_{4/2}$ | or | $TiR'O_{3/2}$ | or | $TiR'_2O_{2/2}$ | or |
| $AlO_{3/2}$ | or | $AlR'O_{2/2}$ | | | | where R' is a methyl or ethyl,
the ratio between the silicon atoms in formula (2) to the bridge atoms silicon, titanium and aluminum is from 1:0 to 1:10 and $x^{n-}$ is $Cl^-$, $Br^-$ or $I^-$, is reacted with stoichiometric, low or excess amounts of $Na_3RhCl_6$, $K_3RhCl_6$, $(NH_4)_3RhCl_6$, or $(NH_4)_2RhCl_5$ which optionally contain water of crystallization or the corresponding free acid
in water or with a polar organic slovent which dissolves the rhodium compounds at least partially for the mutual partial or complete exchange of the anions.

5. A method for preparing a compound according to claim 1 comprising reacting an organopolysiloxane-ammonium compound of the formula

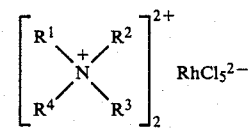

or

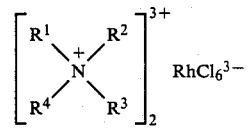

with CO at a total pressure of approximately 1 bar to approximately 200 bar at a temperature of 60°-200° C. in the presence of water,
and in the presence of an alkyl iodide with 1-10 C atoms, elementary iodine or hydroiodic acid in a polar solvent.

6. The method according to claim 5 further comprising separating the resulting product from the solvent phase, washing the product, drying the product at room temperature to 200°, and classifying by particle size.

7. A rhodium-containing organopolysiloxane-ammonium compound according to claim 1, characterized that the molar ratio between the anion types $[Rh(CO)_2I_2]^-$, $[RhCl_6]^{3-}$ or $[RhCl_5]^{2-}$ and the halogen ions $Cl^-$, $Br^-$ or $I^-$ is between 1:1 and 1:100.

8. The method according to claim 4, wherein the rhodium-containing solid is separated from the liquid phase and washed, dried at room temperature up to 200° C. under a protective gas or a vacuum, classified according to particle size and tempered at 150°-250° C.

9. A method for preparing a solid compound in accordance with claim 1, wherein $x^{n-}$ is $[Rh(CO)_2I_2]^-$ with optionally $Cl^-$, $I^-$ or $Br^-$, comprising reacting a rhodium compound which is dissolved at least partially in a polar solvent, and exhibits the formula $Na_3RhCl_6$, $K_3RhCl_6$, $(NH_4)_3RhCl_6$, $(NH_4)_2RhCl_5$, $RhY_3$, $Rh(NO_3)_3$, $Rh_2O_3$, $Rh(acac)(CO)_2$, $RhH(CO)(PPh_3)_3$, $RhCl(As\ Ph_3)_3$, $RhCl(PPh_3)_3$, $[RhY(diene)]_2$, $[RhY(C_2H_4)_2]_2$, $[RhY(CO_2]_2$, $[Rh(OAc)]_2$, $Rh(acac)_3$ or $RhCl(CO)(PPh_3)_2$, whereby
Y = chlorine, bromine or iodine
diene = cylooctadiene or norbornadiene
Ph = phenyl
OAc = acetate
acac = acetyl acetonate, with CO at a total pressure of approximately 1 bar to approximately 200 bar at 60°-200° C. in the presence of water, an alkyl iodide with 1-10 C atoms, elementary iodine or hydroiodic acid and in the presence of an ammonium polysiloxane of the formula:

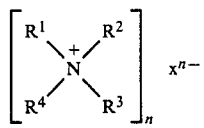

in which $R^1$-$R^4$ and $x^{n-}$ have the same significance as in claim 1 and $x^{n-}$ is $Cl^-$, $Br^-$ or $I^-$ until the $[Rh(CO)_2I_2]_2^-$ anion formed thereby has been brought partially or completely into the ammonium polysiloxane to obtain the intended product.

10. The method according to claim 9 wherein the solid rhodium containing product obtained thereby is separated from the liquid phase and washed, dried at room temperature up to 200° C., classified according to particle size and tempered by heating at 150°-250° C. under an atmosphere of protective gas or in a vacuum.

* * * * *